United States Patent [19]

Adcock et al.

[11] 4,107,732
[45] Aug. 15, 1978

[54] TWO SENSOR TIME ENCODED COLOR IMAGING SYSTEM

[75] Inventors: Willis A. Adcock; Frank L. Skaggs, both of Dallas, Tex.

[73] Assignee: Texas Instruments Incorporated, Dallas, Tex.

[21] Appl. No.: 700,359

[22] Filed: Jun. 28, 1976

[51] Int. Cl.$^2$ .............................................. H04N 9/07
[52] U.S. Cl. ...................................................... 358/43
[58] Field of Search ............................... 358/41, 43, 50

[56] References Cited

U.S. PATENT DOCUMENTS

| | | | |
|---|---|---|---|
| 3,975,760 | 8/1976 | Yamanaka et al. | 358/41 |
| 3,982,274 | 9/1976 | Chai | 358/41 |
| 4,016,598 | 4/1977 | Yamanaka | 358/41 |

Primary Examiner—John C. Martin
Assistant Examiner—Aristotelis M. Psitos
Attorney, Agent, or Firm—Rene'E. Grossman; Stephen S. Sadacca

[57] ABSTRACT

Light from an object to be imaged is optically divided into two portions. The first portion, preferably corresponding to one primary color, is encoded into a series of electrical pulses by a charge coupled device image sensor. The second portion corresponding to two other primary colors is further filtered by a striped optical filter and encoded into a series of electrical pulses by a second charge coupled device image sensor. The electrical pulses from the first and second image sensors are then time decoded by a decoder circuit to produce three color information signals.

28 Claims, 10 Drawing Figures

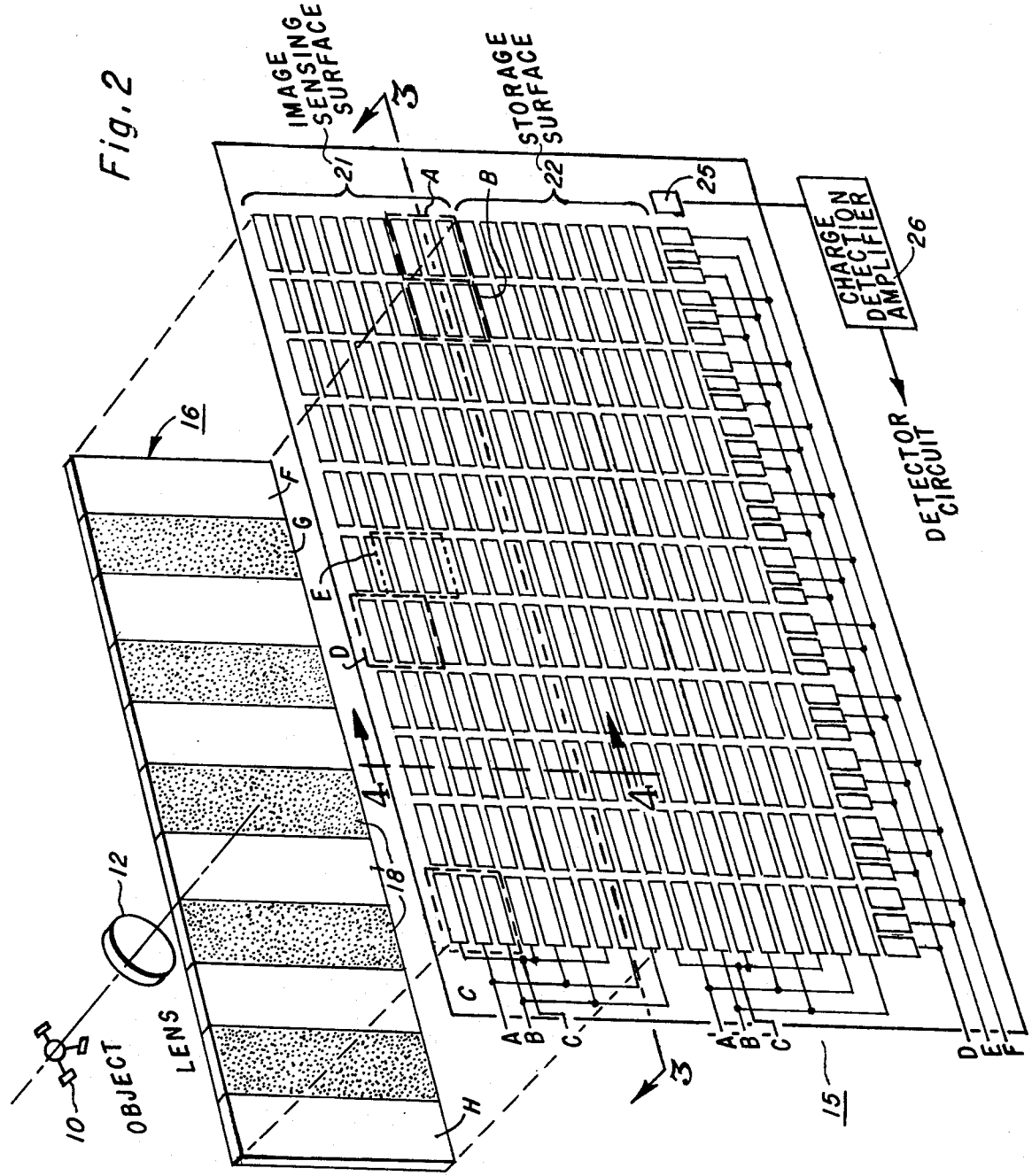

TWO SENSOR TIME ENCODED COLOR IMAGING SYSTEM

BACKGROUND OF THE INVENTION

The present invention relates to a color imaging system and more particularly to an improved imaging system using two charge coupled device (CCD) image sensors for producing color information signals in response to light received from an object. The disclosed color imaging system may be used as part of a color television camera, particularly, a small hand held color television camera.

Conventional color television camera systems generate the three color signals, e.g., red, green and blue signal, using three separate vidicon tubes. Splitting the light coming from the object to be televised into three primary colors for transmission to the three vidicons and the magnetic or electrostatic deflection systems associated with each vidicon have resulted in the prior color TV cameras being relatively large and heavy. While this prior art system produces a high quality color signal, the bulk and weight of the camera associated with this system makes it difficult to use, for instance, in hand held applications.

In the prior art there have been suggestions for color television image pickup systems which utilize, for instance, a striped optical filter and one or two vidicons, or similar devices such as the "plumbicon." Since white and colored light are reproducable using three primary colors, these one or two vidicon systems must be able to discern three primary colors. Typically, a striped optical filter is disposed in front of the vidicon interpreting two or three primary colors. The striped filter causes an alternating pattern of narrow stripes of different color light from the object to fall upon the vidicon's sensitive surface. These stripes are selected sufficiently narrow such that the number of different segments or portions of the output signal from the vidicon, corresponding to striped pattern of light falling on the vidicon's sensitive surface, provide sufficient resolution to yield a clear picture.

The magnetic or electrostatic deflection system used with a vidicon, or similar device, causes its electron beam scan or interrogate its light sensitive surface to produce an output signal; however, its electron beam does not move with constant speed across the light sensitive target. While the output signal contains signal pulses corresponding to the intensity of light falling along the electron beam scan line, there is an inherent uncertainty as to the particular color of light triggering a particular pulse. This uncertainty is caused by a combination of the non-constant speed of interrogation along a scan line and the lack of means for determining which color of light produced a particular output pulse. This uncertainty makes it difficult for the decoding circuitry to discern which segments of the output signal correspond to a particular primary color. Complex circuits have been utilized to compensate for this uncertainty. For instance, by using a parallel striped filter having a different pitch stripe for each color, color information is then associated with different carrier frequencies (in the output signal) corresponding to the pitch of the stripes, which information can be separated into separate color information signals using band pass filters. Alternatively, the prior art suggests disposing the stripes at angles and using phase demodulation techniques to separate the color information signals. In either case, the decoding circuitry is complex and because of bandwidth limitations of the vidicon, they are not totally satisfactory. These two vidicon systems used in the prior art incorporate such complex circuitry to compensate aforementioned scanning uncertainties in decoding the color signals generated by the vidicons.

In the prior art it has also been proposed that a charge coupled device (CCD) be used as an image sensor. For instance, U.S. Pat. No. 3,801,884 issued Apr. 2, 1974, discloses the use of a CCD array in an image pickup system. CCD arrays having 512 by 320 cells for use as an image sensor are currently commercially available from Radio Corporation of America, Lancaster, PA. under the tradename SID51232. Image sensing CCDs are made up of an array of charged coupled cells which use a clock rather than a scanning electron beam to scan or interrogate the cells. Since highly accurate clocks are known in the prior art, the CCD image sensor does not suffer the non-linearity associated with the magnetic or electrostatic deflection system of a conventional vidicon. That is, a particular output pulse from the CCD image sensor can be associated with a particular physical location on the image sensing surface of the CCD.

There has also been a proposal to use a single CCD image sensor in a color image pickup system, as is described in U.S. patent application Ser. No. 502,289, dated Jan. 13, 1976. This system utilizes a complex optical filter whose filter elements are arranged in an array and are sized approximately one-half the size of the CCD elements in the CCD array. This system further provides merely one of two color information signals for each scan line in sequential fashion in addition to a luminance signal for each scan line.

It is, therefore, an object of this invention to improve color television image pickup systems.

It is yet another object of this invention to reduce the complexity of color television pickup systems, for example, by using simplified circuits to decode the signals from two CCD image sensors, to produce three color signals suitable for use in broadcasting a color image of the object.

It is still another object of this invention to use a striped optical filter in conjunction with two CCD image sensors to produce three color signals suitable for use in broadcasting a color image of an object.

It is still yet another object of this invention to simplify striped filters used in two sensor color imaging systems.

It is another object of this invention to produce the color information signal during each scan line producing video information.

It is still another object of this invention to reduce the size of color television camera systems.

It is still yet another object to produce a color television camera system of lower cost than the systems generally in use in the prior art.

The foregoing objects are achieved according to the present invention as is now described. In a preferred embodiment of the invention, two CCD image sensors are utilized. Green light from an object is directed to the first image sensor while combined red and blue light is directed to the second image sensor by a partially reflective mirror. A striped optical filter is disposed between the light source and the second image sensor such that alternating stripes of red and red + blue light are imaged on the second image sensor's sensitive surface. The output from the red and red + blue image sensor is converted into separate red and blue color information signals by examining the pulses or segments of the image sensor signal corresponding to red stripes of light to generate the red color information signal and by examining the pulses or segments of the image sensor signal corresponding to red + blue stripes of light and substracting the pulses or segments of the signal corresponding to adjacent red stripes therefrom to produce the blue color information signal. Alternate embodiments disclosed use different combinations of primary colors to produce three color information output signals and use a striped filter which passes alternating stripes of red and blue light.

BRIEF DESCRIPTION OF THE DRAWINGS

FIG. 2 is an exploded perspective view of the striped filter disposed over an image sensor.

DETAILED DESCRIPTION OF A FIRST EMBODIMENT

Figure 1:
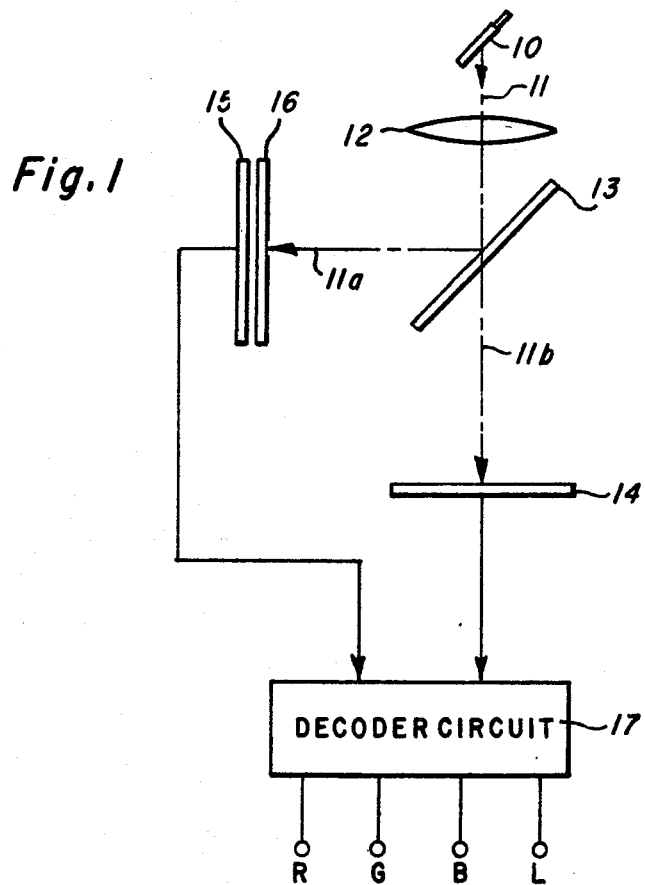
FIG. 1 shows in block diagram form the paths of light to the two image sensors and the paths of electrical signals from the sensors to the output.

Referring now to FIG. 1 there is shown in diagrammatic form our two sensor time encoded color television image system. A ray of light 11 from an object 10 to be televised passes through a lens 12 which focuses the ray of light 11 on a pair of image sensors 14 and 15. The ray of light is separated into two portions 11a and 11b which are directed to the respective image sensors 15 and 14 by a partially reflective mirror 13. Partially reflective mirror 13, in this embodiment, passes one primary color of light while reflecting two primary colors of light. The two reflected primary colors of light in ray 11a pass through a striped filter 16 before striking the sensitive surface of image sensor 15. In an alternate embodiment partially reflective mirror 13 passes two primary colors and reflects but one primary color with striped filter 16 being disposed in front of image sensor 14, resulting in a color television image system still having one CCD image sensor producing a signal corresponding to one primary color and a second CCD image sensor producing a signal corresponding to two primary colors as is produced by the embodiment depicted in FIG. 1.

The two image sensors 14 and 15 produce electrical signals representative of the amplitude and position of light impinging the sensitive surfaces thereof. The signals are applied to a decoder circuit 17 which decodes the signals and produces red, green and blue color signals, as well as a liminance signal. Utilizing any three of the aforementioned signals, the fourth can be generated therefrom. While the decoder circuit 17 need only produce three of such color information signals, the decoder is depicted as producing four color information signals (e.g., the red, green and blue color signals as well as a luminance signal) because of a common usage of such signals in the television broadcasting industry. However, the matrix circuit could produce the L, I & Q signals also known in the television broadcasting industry.

Referring now to FIG. 2, there is shown an exploded perspective view of a CCD image sensor 15 with the optical striped filter 16 disposed between CCD image sensor 15 and object 10. The aforementioned partially reflective mirror 13 (FIG. 1) is not shown in FIG. 2 for sake of clarity. It should also be understood that filter 16 would typically be disposed adjacent to image sensor 15.

Light from object 10 is focused by lens 11 onto the image sensing surface 21 of image sensor 15. Light is inhibited from falling on storage surface 22 of CCD image sensor 15, for instance by an opaque layer (not shown) or other means. It should be understood, moreover, that storage surface 22 is used to facilitate the production of video signals which are properly timed for use with standard broadcast television systems and that such a storage surface is not required to operate a CCD image sensor nor is it required in the practice of the present invention. If storage section 22 is not used, however, a shutter (not shown) is typically disposed between object 10 and CCD image sensor 15.

Image sensor 15 is shown as being of the three phase frame transfer type, which can be advantaneously used to produce an output signal having a 2:1 interlace, such as that used in standard broadcast television. It should be understood, however, that our invention is operable with CCD image sensors of the two or four phase frame transfer type as well as CCD image sensors utilizing other clocking schemes.

The image sensing surface 21 and the storage sensing surface 22 are each shown with 9 rows of electrodes, the electrodes being further grouped into 11 columns. The electrodes in any given row are connected in common to one of the busses A, B, C, A', B', or C'. The electrodes are shown as being separated into columns to more clearly depict the light sensitive areas of the semiconductor material underlying the electrodes. The separation between rows is exaggerated for sake of clarity.

Busses A, B, C, A', B', and C' are clocked to transfer the charges stored under the electrodes (in a semiconductive substrate) from image sensing surface 21 to storage surface 22. Busses A', B', C', D, E and F are clocked to transfer the charges stored in storage surface 22 to a charge detection amplifier 26 via a video output terminal 25. Methods of clocking CCD image sensor to obtain a video signal are well known in the art and therefore, we have not explained in detail the operation of the CCD image sensor.

Figure 3:
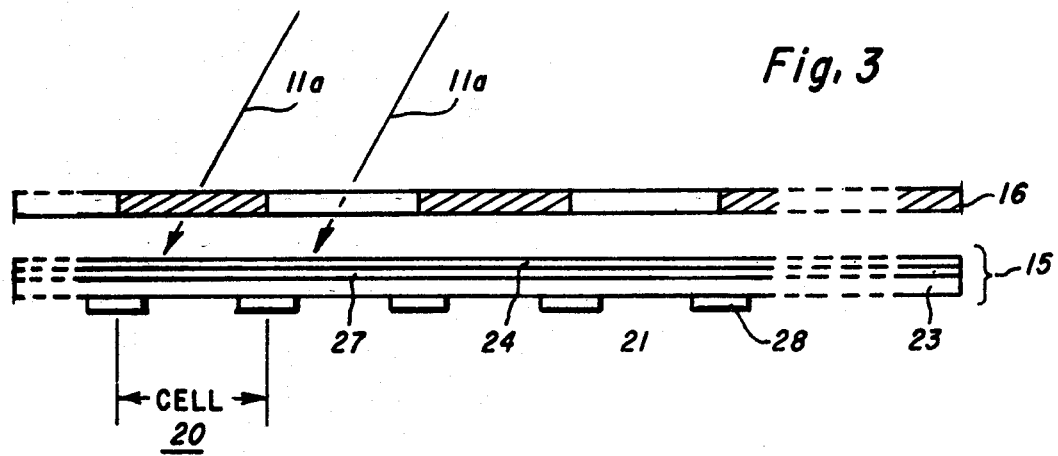
FIGS. 3 and 4 are cross-sectional views through the striped filter and the image sensor.
Figure 4:
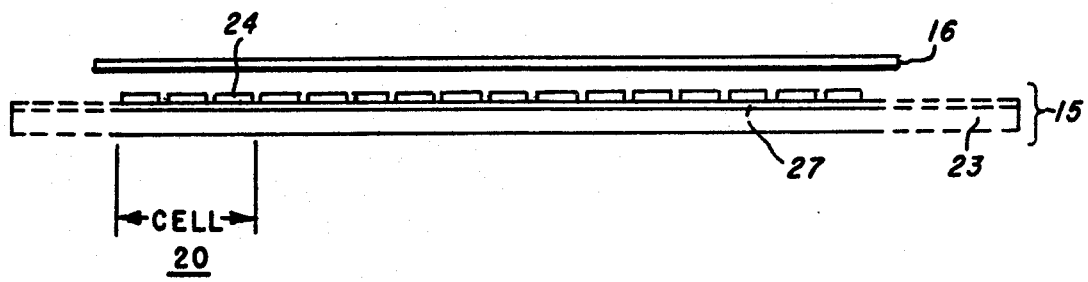

Since this is a three-phase system, three adjacent electrodes, separately connected to the A, B and C busses, comprise one row of sensitive cells 20 (FIGS. 3 and 4). The boundaries between the columns of cells 20 are defined by charge barriers 28 (FIG. 3) disposed in or near the semiconductive substrate. Exemplary of such cells, are those cells indicated by reference A, B, C and D. It should be evident that there are 33 such cells 20 in the depicted image sensing surface 21 and that it requires many more than that number of cells to produce a high resolution image.

If interlace scanning is utilized, then the electrodes are clocked differently in alternate frames to form cells A, B, C, and D during one frame and intermediate cells, such as the cell denoted by reference E, during a next frame. It should be understood that the cells are not physically moving, rather the centers of the light sensitive area are being electrically displaced. Clocking the image sensor 15 differently in successive frames effects a 2:1 interlace similar to that used in standard television broadcasting.

Each light sensitive cell of image sensor 15 produces a pulse at output terminal 25 when the cells are read out by properly clocking busses A, B, C, A', B', C', D, E and F. Each pulse is indicative of the amount of light impinging the corresponding cell since the last time a pulse was read out of that cell.

Filter 16 is arranged with stripes 17 being positioned to cause a different color light to impinge each column of cells. As a frame is being read out of image sensor 15, the first pulse read out in the first scan line corresponds to the light impinging Cell A through stripe F, the second pulse in the first scan line will correspond the light impinging cell B through stripe G and the last pulse in the last scan line will correspond to the light impinging cell C through stripe H. Thus the output signal from image sensor 15 comprises a series of pulses with adjacent pulses in any given scan line corresponding to different colors of light passing through filter 16. The pulses are typically processed by a charge detection amplifier 26 before being processed by decoder circuit 17. A charge detection amplifier is a well known apparatus and is here used with the CCD image sensors to convert the CCD output charge pulses to a suitable voltage or current signal for further processing.

Since accurate clocks for driving busses A, B, C, A', B', C', D, E and F are known, and since according to the present invention, adjacent cells 20 in a scan line correspond to different colors in filter 16, the output pulses from image sensor 15 each correlate with the color of light which produced such pulse to a high degree of certainty; this certainty is not achievable with a conventional vidicon because of the aforementioned non-linearity associated with the magnetic or electrostobe deflection circuits. In the practice of the present invention, it is desirable that the output pulses from the area imaging sensor utilized exhibit a high degree of certainty as to the correspondence of a particular segment or pulse of the output signal from the device to the particular color of light from the object which generated that segment or pulse. Thus, it can be seen from the foregoing discussion that a CCD image sensor fulfills this criteria.

FIG. 3 is a sectional top view through image sensor 15. Referring to FIG. 3, filter 16 is shown disposed adjacent to image sensor 15, it being understood that filter 16 could be applied directly to image sensor 15. One of the electrodes 24 associated with a cell 20 is shown disposed over an insulating layer 27 which is in turn disposed over a semiconductive substrate 23 wherein the charges for each cell 20 are stored. Channel stops 28 provide charge isolation barriers between columns of cells 20. While image sensor 15 is shown with preferable front side illumination, it should be understood that the invention is also operable with back side illuminated CCD image sensors.

FIG. 4, is a sectional side view through CCD image sensor 15 and filter 16. Filter 16 is not depicted with stripes in this view because the section view is being taken through a single stripe. Three electrodes 24 are depicted as being associated with a single cell 20, in agreement with the three phase system depicted in FIG. 2, it being understood that two and four phase and other clocking systems are as well operable in the practice of our invention.

Referring again to FIG. 1, in an embodiment in which semi-reflective mirror 13 transmits green light and reflects red and blue light, then ray 11b corresponds to the green light eminating from the object and ray 11a corresponds to red + blue light would then impinge upon image sensor 15 after being filtered by striped filter 16. Referring again to FIGS. 2 and 3, the first embodiment of striped filter 16 is respectively selected to pass the red + blue light to selected columns of cells 20 and to pass only red light to the interleaved columns of cells 20. In such first embodiment, the striped filter 16 depicted in FIG. 3 passes, for instance, both red and blue light where the filter is depicted as being clear and passes only red light where the filter is depicted by shading lines. The output from CCD image sensor 15 comprises a series of pulses corresponding the amplitude and position of light impinging upon its sensitive surface with some pulses of the information corresponding to the red + blue light impinging upon its sensitive surface and with other pulses corresponding to only the red light falling upon its sensitive surface, these pulses being interleaved according to the pattern of stripes formed by filter 16.

Figure 5:
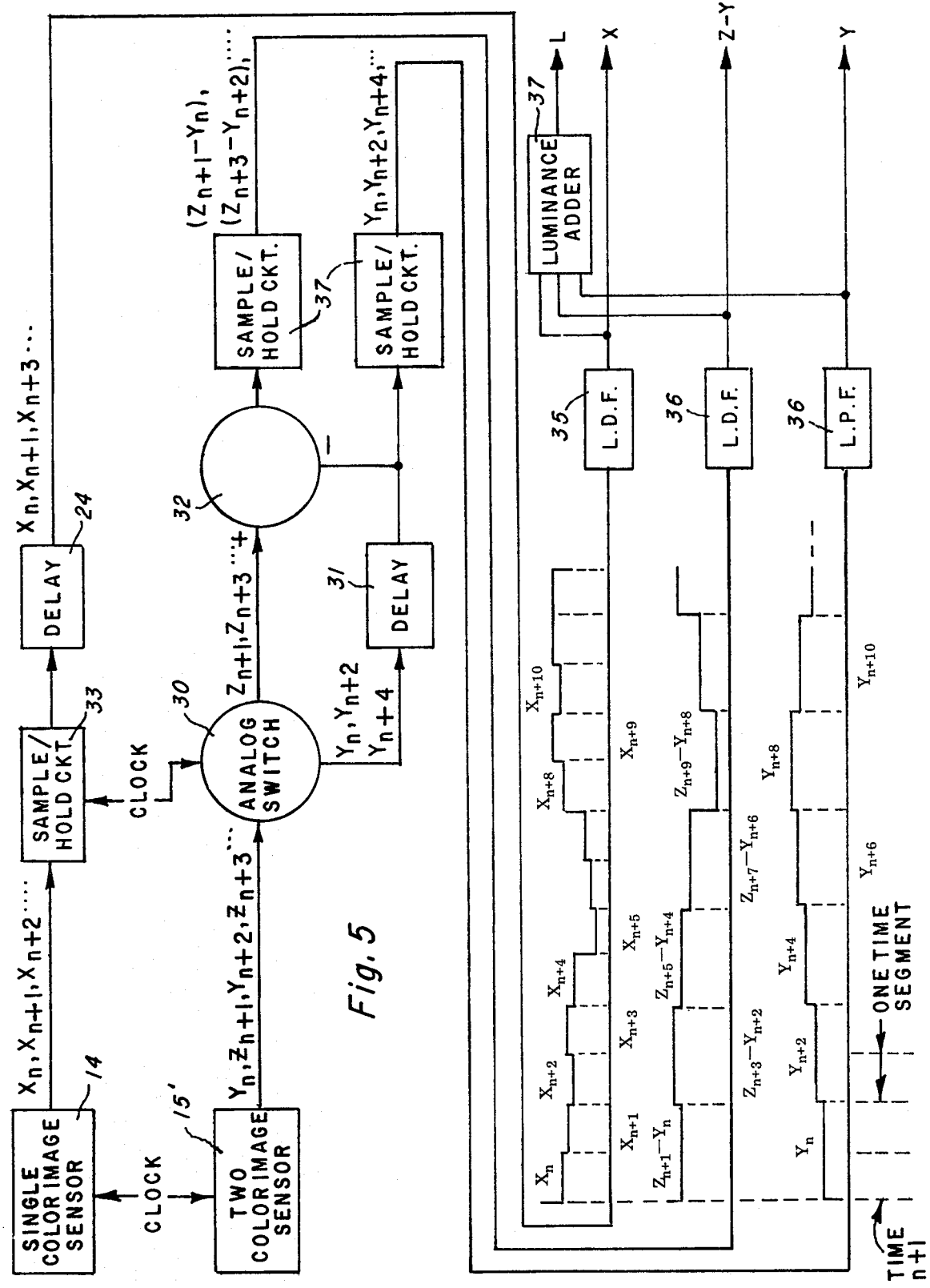
FIG. 5 is a block diagram schematic of a first embodiment of the system for decoding the electrical signals from the image sensors, FIGS. 6(a) and (b) are graphs on which is plotted curves of green light, red light and blue light as well as the photopic response of the human eye.

Referring now to FIG. 5, there is shown in block diagram form a schematic at a first embodiment decoder circuit 17 according to the present invention. As aforementioned, the output from the image sensor 15 which corresponds to two colors of light is a signal comprising interleaved pulses or segments of color information. In FIG. 5, the output from image sensor 15 is shown as $Y_n$, $Z_{n+1}$, $Y_{n+2}$, $Z_{n+3}$, . . . the capital letters referring to the signal amplitude for a particular color or combination of colors while the subscripts indicate the time since the beginning of a scan line at which the particular signals are generated by the sensor. The letters X, Y and Z are used in FIG. 5 to denote the signals representing the colors or combination of colors generated by the image sensors 14 and 15, to demonstrate the general applicability of this first embodiment decoding circuit 15. The relationship of the colors X, Y & Z to the colors utilized in the preferred embodiment, e.g., red, green and blue will henceforth be described in detail.

The output from the two color image sensor 15' (i.e., the CCD image sensor 15 including striped filter 16) is applied to an analog switch 30 which is operated in timed relation to the clock interrogating the two color image sensor 15'. Techniques for operating analog switch 30 in timed relation to such a clock signal which is indicative of which color of light produced the segment of output signal from two color image sensor 15' then received by analog switch 30, are well known in the art. Analog switch 30 has two outputs, one output providing to the Y signal at times $n$, $n+2$, $n+4$ and so forth and the second output providing the Z signal at times $n+1$, $n+3$ and so forth. The Y signal is passed through a delay circuit 31 which delays the Y signal one time segment (e.g., one pulse width), that is, pulse $Y_n$ will appear at the output of delay circuit 31 at time $n+1$, pulse $Y_{n+2}$ at time $n+3$ and so forth. The Z signal is applied to one input of substracting circuit 32, the output from delay circuit 31 being applied to the other input of substracting circuit 32. The Y signal, being delayed one segment time, is substracted from the Z signal appearing at that segment time. Consequently, the output from substracting circuit 32 comprises a series of pulses corresponding to the quantities $(Z_{n+1}-Y_n)$, $(Z_{n+5}-Y_{n+4})$ and so forth.

It is preferable to make the quantity Z−Y represent a pure color to simplify later signal processing. Thus Z corresponds to the combined light of two primary colors and Y corresponds to one of those two primary colors; for instance, if Z were red + blue and Y were red, then Z−Y would correspond to blue.

Again referring to the analog switch 30, the delay circuit 31 and the substracting circuit 32, it should be evident to one skilled in the art that the Z−Y and Y pulses occuring at the outputs of substracting circuit 32 and delay circuit 37 will each be one half the frequency of the signal from dual color image sensor 15' and further will have one half the duty cycle. Thus the Z−Y and Y pulses occur only at segment times $n+1$, $n+3$, $n+5$ . . . . To produce Z−Y and Y output signals at $n+2$, $n+4$ . . . segment times, these Z−Y and Y outputs are applied to inputs of sample and hold circuits 37 to cause the signals appearing at segment time $n+1$ to appear at the outputs of sample and hold circuits at segment times $n+1$ and $n+2$. Similarly, inputs appearing at segment time $n+3$ appear at the outputs of sample and hold circuits 37 at segment times $n+3$ and $n+4$. Thus, the pulses representing Y and Z−Y occur at one half the frequency of the pulses representing X, the Y and Z−Y pulses being two time segments long while the X pulses are but one time segment long. The reason this lower frequency in the Z−Y and Y channels does not unduely degrade picture quality is subsequently discussed more fully.

The output from the single color sensor 14 is applied to a sample and hold circuit 33 and thereafter to a delay circuit 34 which delays the X signal one time segment, thereby keeping it in proper timing with the delayed Y signal. The X, Z−Y, and Y outputs are shown in FIG. 5 as a series of varying amplitude pulses, having the aforementioned frequency relationships. Sample and hold circuits 33 and 37 are employed to capture that part of each CCD output pulse which contains amplitude information and to reject those parts which do not contain amplitude information, in addition to the previously mentioned purpose for sample and hold circuit 37. Sample and hold circuits 33 and 37 and their use with CCD imaging arrays are well known in the prior art.

As a new X color information pulse is generated each segment time, the X pulses occur at segment times $n+1$, $n+2$, $n+3$ and so forth. As aforementioned, the Z−Y and Y pulses are generated by the decoder circuit only for each two segment times. The X output is then passed through a low pass filter 35 which has bandwidth of approximately 3 magahertz. Similarly the Z−Y and Y signals are passed through low pass filters 36 and 37 each of which has a bandwidth approximately 1.50 megahertz. The outputs from the three low pass filters 35 and 36 supply three color signals and similarly the three outputs may be applied to the input of a luminance adder matrix 38 to generate a luminance signal. It can be seen that the low frequency portions of the luminance signal, i.e., those below 1.50 megahertz comprise portions of X, Z−Y and Y signals whereas the higher frequency portions of the luminance signal, i.e., those between approximately 1.50 megahertz and 3 megahertz, are made up of primarily the X signal; this dependence on primarily the X signal for the higher frequency portions of luminance signal provides a pleasing picture to the human eye, especially if the X signal is selected to represent either the white light or the green portions of the color signal for reasons which are discussed below. The bandwidth of the Z−Y and Y filters 36 is limited to 1.50 $MH_z$ (as might be suggested by the fact that the Z−Y and Y signal frequencies are half the frequency of the X signal) to reduce the propensity of the system to generate moire interference patterns in accordance with information processing theory. Using a 1.50 $MH_z$ filter does not reduce picture quality to the human eye.

As the physical size of a source of light decreases, that is, as the subtended angle of incidence in the human eye loses its ability to discern color information before it loses it ability to discern the presence of the object. Effectively, the response of the human eye to color information has a narrower bandpass than its response to luminance information. Therefore, in color television systems, the color signals need not have the same bandwidth as the luminance signal simply because there is no purpose in displaying information which the human eye cannot discern.

Figure 6A:
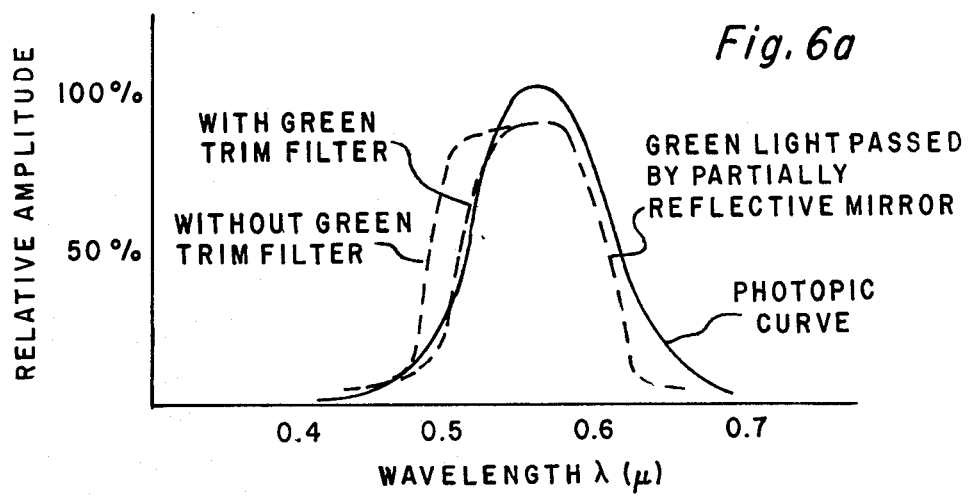
Figure 6B:
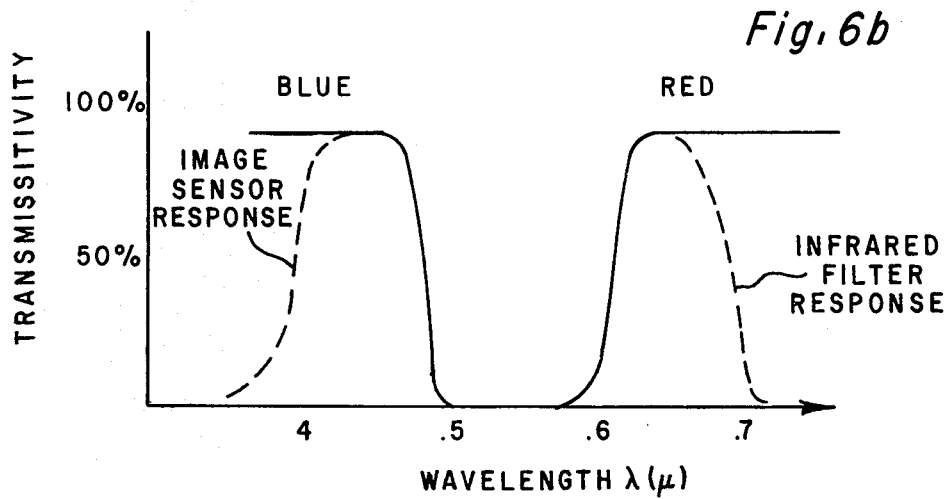

Referring now to FIG. 6(a), there is graphically shown the curve of wavelength versus relative amplitude of green light passed by partially reflective mirror 13 in relation to the photopic response of the human eye. As perfect filters are difficult to manufacture, a green trim filter may be used with mirror 13 to eliminate unwanted blue light from the light impinging image sensor 14. Given the excellent correspondence between green light and the photopic curve and since the aforementioned insensitivity of the human eye to the color of light having small angles of incidence affects red and blue light before it affects green light, the higher frequency X color information signal, which is capable of representing smaller size objects, preferably corresponds to the color green (or to luminance information). In FIG. 6(b), the frequency distribution of the red and blue color light impinging two color sensor 15' is depicted. The infrared response is preferably limited by an infrared filter used with lens 12 while ultraviolet response is typically limited by image sensor 15 response.

Thus, in the practice of our invention, it is preferred that the high frequency signal from the single color sensor 14 comprise the green color information while the red and blue color information be directed to the two color sensor 15'. Therefore, in FIG. 5, in the practice of the preferred first embodiment, X may be replaced by G to represent green, Y may be replaced by R to represent red, Z may be replaced by B plus R to represent red plus blue and Z-Y consequently can be replaced by simply B for blue. Two color sensor 15' produces interleaved segments corresponding to red plus blue and red alone utilizing the partially reflective mirror 13 which directs red plus blue light towards the CCD image sensor 15 and a red and clear striped filter 16 as was previously discussed with reference to FIGS. 1 and 3.

Alternatively, the X channel can correspond to luminance information if the partially reflective mirror 13 is selected to pass red and blue light, in addition to green light, to image sensor 14. Then the X output from decoder circuit 17 corresponds essentially to luminance information and a green matrix circuit must be used, in lieu of luminance adder 38, for instance. The green matrix circuit is then responsive to the X (luminance), Z-Y (blue) and Y (red) signals for substracting the red and blue signals from the luminance signal to generate a green color information signal. The X channel is this alternate embodiment provides a luminance color information signal.

DETAILED DESCRIPTION OF A SECOND EMBODIMENT

Figure 7:
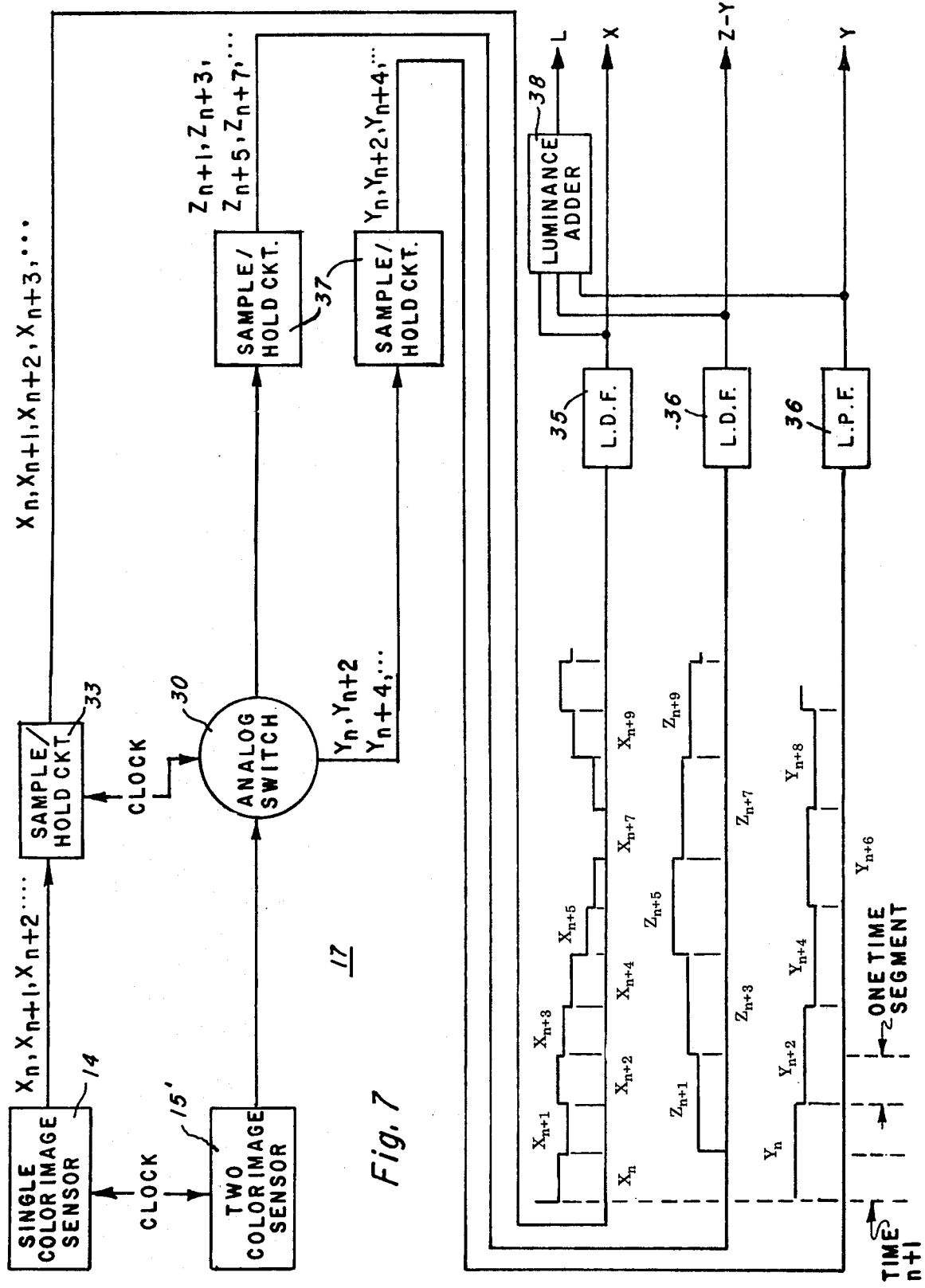
FIG. 7 is a block diagram of a second embodiment of the system for decoding the electrical signals from the image sensors.

Referring now to FIG. 7, there is shown in block diagram form a schematic of a second embodiment of decoder circuit 17 according to the present invention. As in the first embodiment of decoder circuit 17, the output from the image sensor 15 which corresponds to two colors of light is a signal comprising interleaved pulses or segments of color information. In FIG. 7, the output from dual color sensor 15' is shown as $Y_n, A_{n+1}, Y_{n+2}, Z_{n+3}, \ldots$ . The capital letters referring to the signal amplitude for a particular color while the subscripts indicate the time since the beginning of the scan line at which the particular signals are generated by two color sensor 15'. The letters X, Y and Z are used in FIG. 7 to denote the signals representing the colors generated by CCD image sensors 14 and 15, to demonstrate the general applicability of the second embodiment of the decoder circuit 17. The relationship of the colors X, Y and Z to the colors utilized in the second embodiment, e.g., red, green, and blue, will henceforth be described in detail.

The output from the second embodiment of two color image sensor 15' comprises interleaved segments or pulses corresponding to two different primary colors. This differs from the first embodiment where the interleaved segments or pulses corresponded to pulses representing two primary colors and pulses corresponding to one of those two primary colors. In the second embodiment, the two different primary colors are produced using a striped dichromatic optical filter 16 which alternating passes only red light in one of the set of stripes and only blue light from the interleaved stripes.

The output from the two color image sensor 15' is applied in the second embodiment to an analog switch 30 which is operated in time relation to the clock signal which is indicative of the color of light produced by the segment or pulse of the output signal from two color image sensor 15'. Analog switch 30 has two outputs, one of the output corresponding to the Y color at times $n, n+2, n+4$, and so forth with another output corresponding to the Z color at times $n+1, n+3, n+5$, and so forth. The Y color output and the Z color output from analog switch 30 are passed through sample and hold circuits 37 which (1) capture that part of each CCD output pulse which contains amplitude information and rejects those parts which do not contain amplitude information and (2) holds the pulse over two segment times, similarly as was done in the first embodiment, such that the $Y_n$ signal appears at segment times $n$ and $n+1$, the $Y_{n+2}$ signal appears at segment times $n+2$ and $n+3$ and so forth; the $X_{n+1}$ signal appears at segment times $n+1$ and $n+2$, and so forth. The output from image sensor 14 is passed through a sample and hold circuit 33 as was done in the first embodiment. The X, Y and Z outputs from the three sample and hold circuits are then passed through their respective low pass filters 35 and 36 to produce three color information signals X, Y and Z.

The decoder circuit disclosed as the first embodiment, allows stripe filter 16 to have alternating color and clear stripes thus requiring but one filter media, e.g., opaque to blue light, in the filter design. In the second embodiment, on the other hand, the striped filter 16 must have alternative stripes of filter media. Thus the first embodiment of the invention permits the use of a simpler, single media striped filter having alternating clear and color stripes.

As can be seen from FIG. 7, the pulses entering X channel low pass filter 35 occurs at approximately twice the frequency as the Y and Z pulses entering Y and Z low pass filters 36. For the aforementioned reasons regarding the sensitivity of the human eye, we prefer to practice the second embodiment of our invention with the X channel corresponding to green (or white light) and the Y and Z channels corresponding to red and blue.

While we prefer to practice our first and second embodiments of our invention with the X channel corresponding to the green color signal, it should be evident to one trained in the art, however, that other color schemes may be used with the present processing systems. For instance, instead of using primary colors red, blue and green, their opposites may be used, namely cyan, magenta and yellow or the X channel may correspond to the luminance information, as aforementioned.

Figure 8A:
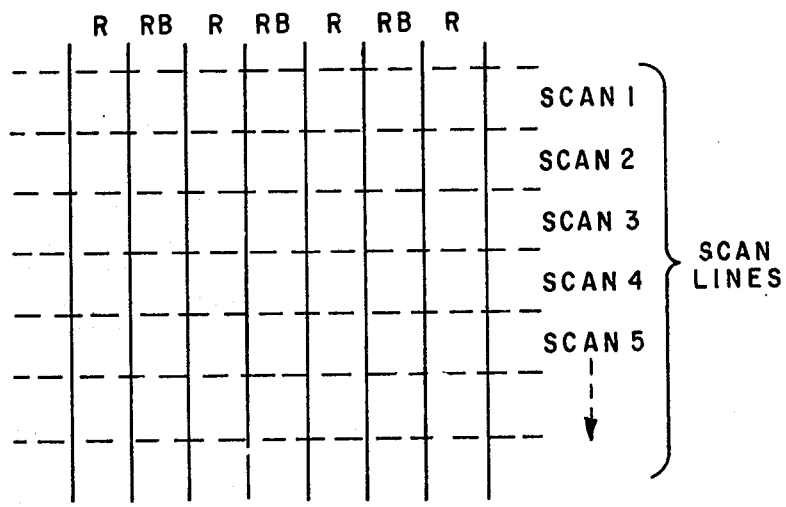
FIG. 8 is a diagram depicting the preferred direction of scanning in relation to the direction of stripes and FIG. 8b is a diagram depicting an alternate embodiment of scanning direction.
Figure 8B:
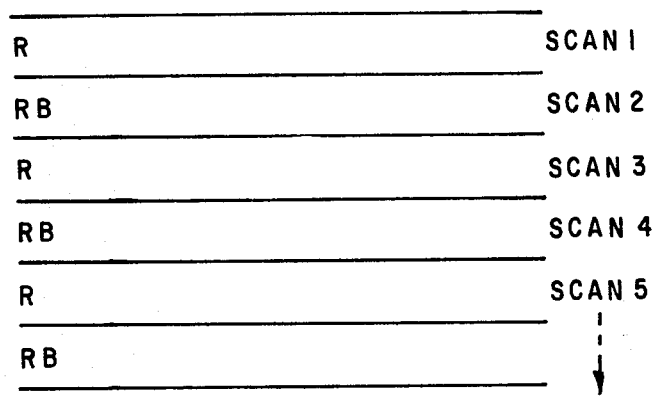

Further, while the direction of scanning the image sensor has preferrably been shown at right angles to the direction of stripes and the stripe filter 16, the stripes may be disposed essentially parallel to the direction of scanning the image sensor 15. As is shown in FIGS. 2 and 8a, the scan line (labelled scan 1 – scan 5 in FIG. 8a) are disposed at right angles to striped filter 16, which alternately passes red and blue plus blue light in the preferred first embodiment or alternately passes red and blue light in the second embodiment. Of course, other colors may be used in filter 16 as aforementioned. The direction of stripes may be nonperpendicular to the direction of scanning, for instance, parallel thereto, as shown in FIG. 8b. In this alternate embodiment, an entire scan line of video information is stored for comparison with an adjacent line.

Having described the invention in connection with certain specific embodiments thereof it is to be understood that further modification may now suggest itself to those skilled in the art.

For instance, optical resolution reducing filters may be disposed between the object and image sensor 15 for the purpose of reducing optically produced moire patterns. Also, because it is difficult to fabricate a single filter having exactly the transmissivity or reflectivity desired, trimming filters may be used therewith to more closely attain the desired transmissivity or reflectivity. It is to be understood that the invention is not limited to the specific embodiments disclosed except as set forth in the appended claims.

What is claimed:

1. A method producing three color-information signals representative of the shape and color of light received from an object, said method comprising:
   (a) splitting the light from the object into first and second portions, the first portion comprising light of a first primary color and the second portion comprising light of second and third primary colors;
   (b) encoding the first portion into a first color-information signal using a first charge coupled device image sensor, said first color signal corresponding to the light of said first primary color from said object;

(c) spatially filtering out light of said third primary color from said second portion using a striped optical filter;
(d) encoding the spatially filtered second portion into an electrical signal using a second charge-coupled device image sensor, said electrical signal comprising alternating first and second lines of video information, said first lines corresponding to the light of said second and third primary colors received from said object and said second lines corresponding to light of said second primary color received from said object;
(e) storing a selected one of said first and second lines of video information;
(f) substracting the selected lines of video information and the non-selected lines of video information to produce a second color-information signal corresponding to the light and said third primary color light received from said object; and
(g) removing said first lines from said electrical signal to form a third color-information signal, corresponding to the light of said second primary color received from said object.

2. A method of producing three color information signals representative of light received from an object, said method comprising:
(a) splitting light received from the object into first and second portions, the first portion comprising light of at least a first primary color, and the second portion comprising light of second and third primary colors;
(b) encoding the first portion into a first color information signal using a first charge coupled device image sensor, said first color information signal comprising a series of pulses corresponding to the light of said first primary color received by said first image sensor;
(c) selectively filtering out said third primary color from a first part of said second portion, said first part of said second portion and the remaining part of said second portion separately impinging upon a second charge coupled device image sensor;
(d) encoding said first and second parts of said second portion into an electrical signal comprised of a series of pulses using said second charge coupled device image sensor, said electrical signal being representative of the light of said second and third primary colors received by said second image sensor and including pulses representative of the light of said second and third primary colors interleaved with pulses representative of the light of said second primary color;
(e) decoding said electrical signal to produce a second color information signal comprised of pulses representative of the light of said second primary color received by said second image sensor and a third color information signal comprised of pulses representative of the light of said third primary color received by said second image sensor, the pulses of said first color information signal occurring at essentially twice the frequency as the occurrence of pulses of either of said second and third color information signals; and
(f) delaying said second color information signal the the duration of a first color information pulse.

3. A method of producing three color information signals representative of light received from an object, said method comprising:
(a) splitting light received from the object into first and second portions, the first portion comprising light of at least a first primary color, and the second portion comprising light of second and third primary colors;
(b) encoding the first portion into a first color information signal using a first charge coupled device image sensor, said first color information signal comprising a series of pulses corresponding to the light of said first primary color received by said first image sensor;
(c) selectively filtering out said third primary color from a first part of said second portion, said first part of said second portion and the remaining part of said second portion separately impinging upon a second charge coupled device image sensor;
(d) encoding said first and second parts of said second portion into an electrical signal comprised of a series of pulses using said second charge coupled device image sensor, said electrical signal being representative of the light of said second and third primary colors received by said second image sensor and including pulses representative of the light of said second and third primary colors interleaved with pulses representative of the light of said second primary color; and
(e) decoding said electrical signal to produce a second color information signal comprised of pulses representative of the light of said second primary color received by said second image sensor and a third color information signal comprised of pulses representative of the light of said third primary color received by said second image sensor, the pulses of said first color information signal occurring at essentially twice the frequency as the occurrence of pulses of either of said second and third color information signals, said step of decoding said electrical signals including:
  (i) substracting the pulses representative of the light of said second primary color from the pulses representative of the light of said second and third primary colors, thereby obtaining pulses representative of the light of said third primary color alone, and
  (ii) preserving the pulses representative of the color of said second primary color.

4. The method according to claim 3, wherein said step of decoding said electrical signal further includes the steps of sampling and holding said pulses representative of light of said second primary color and said pulses representative of the light of third primary color, for the duration of two of said pulses representative of the light of said first primary color.

5. The method according to claim 3, further including the steps of processing each of said first, second and third primary color information signals with a low pass filter.

6. The method according to claim 3, wherein said first portion comprises the light of said first primary color essentially alone.

7. A method of producing three color information signals representative of light received from an object, said method comprising:
(a) splitting light received from the object into first and second portions, the first portion comprising light of at least a first primary color, and the second portion comprising light of second and third primary colors;

(b) encoding the first portion into a first color information signal using a first charge coupled device image sensor, said first color information signal corresponding to the light of said first primary color received by said first image sensor;

(c) selectively filtering out said third primary color from a first part of said second portion, said first part of said second portion and the remaining part of said second portion separately impinging upon a second charge coupled device image sensor;

(d) encoding said first and second parts of said second portion into an electrical signal using said second charge coupled device image sensor, said electrical signal being representative of the light of said second and third primary colors received by said second image sensor; and (e) decoding said electrical signal to produce a second color information signal representative of the light of said second primary color received by said second image sensor and a third color information signal representative of the light of said third primary color received by said second image sensor, said step of decoding said electrical signal including:

(i) substracting portions of said electrical signal representative of the light of said second primary color from adjacent portions of said electrical signal representative of the light of said second and third primary colors to produce said third primary color information signal, and (ii) preserving said portions representative of the light of said second primary color to form said second color information signal.

8. A method of producing three color information signals representative of light received from an object, said method comprising:

(a) splitting light received from the object into first and second portions, the first portion comprising light of at least a first primary color, and the second portion comprising light of second and third primary colors;

(b) encoding the first portion into a first color information signal using a first charge coupled device image sensor, said first color information signal corresponding to the light of said first primary color received by said first image sensor;

(c) selectively filtering out said third primary color from a first part of said second portion;

(d) selectively filtering out said second primary color light from a second part of said second portion;

(e) encoding said first and second parts of said second portion into an electrical signal using a second charge coupled device image sensor, said electrical signal being representative of the light of said second and third primary colors received by said second image sensor; and (f) decoding said electrical signal to produce a second color information signal representative of the light of said second primary color received by said second image sensor and a third color information signal representative of the light of said third primary color received by said second image sensor.

9. Method according to claim 8 wherein said electrical signal comprises a series of pulses, said electrical signal including pulses representative of the light of said second primary color being interleaved with pulses representative of the light of said third primary color.

10. The method according to claim 9, wherein said first, second and third color information signals each comprise a series of pulses the pulses of said first color information signal occurring at essentially twice the frequency as the occurrence of pulses of either of said second and third color information signals.

11. The method according to claim 10, wherein the step of decoding said electrical signal is accomplished by separating the pulses representative of the light of said second and third primary color from the pulses representative of the light of said third primary color.

12. The method according to claim 11, wherein the step of decoding said electrical signal further includes the steps of sampling and holding said pulses representative of the light of said second primary color and said pulses representative of the light of said third primary color for the duration of two of said pulses representative of the light of said first primary color.

13. The method according to claim 11, further including the steps of processing each of said first, second and third primary color information signals with a low pass filter.

14. The method according to claim 8, wherein said third primary color is selectively filtered out from a part of said second portion and said second primary color is selectively filtered out from another part of said second portion using a striped optical filter.

15. The method according to claim 14, wherein said striped optical filter comprises the filter having essentially constant width stripes, some of said stripes being of material opaque to the light of said second primary color and others of said stripes being of material opaque the light of said third primary color.

16. The method according to claim 14, wherein said second primary color is red, wherein said third primary color is blue and wherein said first portion comprises green primary color light.

17. A method of producing three color information signals representative of light received from an object, said method comprising:

(a) splitting light received from the object into first and second portions, the first portion comprising light of at least a first primary color, and the second portion comprising light of second and third primary colors;

(b) encoding the first portion into a first color information signal using a first charge coupled device image sensor, said first color information signal corresponding to the light of said first primary color received by said first image sensor;

(c) selectively filtering out said third primary color from a first part of said second portion, said first part of said second portion and the remaining part of said second portion separately impinging upon a second charge coupled device image sensor;

(d) encoding said first and second parts of said second portion into an electrical signal using said second charge coupled device image sensor, said electrical signal being representative of the light of said second and third primary colors received by said second image sensor;

(e) decoding said electrical signal to produce a second color information signal representative of the light of said second primary color received by said second image sensor and a third color information signal representative of the light of said third primary color received by said second image sensor; and (f) selectively combining said first, second and third color information signals to produce a luminance signal corresponding to the amplitude and position of all light received by said first and second image sensors.

18. A method of producing three color information signals representative of light received from an object, said method comprising:
(a) splitting light received from the object into first and second portions, the first portion comprising green light, and the second portion comprising red plus blue light;
(b) encoding the first portion into a first color information signal using a first charge coupled device image sensor, said first color information signal corresponding to the green light received by said first image sensor;
(c) selectively filtering out blue light color from a first part of said second portion;
(d) encoding said first part and a part of the remaining red plus blue light of the second portion into an electrical signal using a second charge coupled device image sensor, said electrical signal being representative of the red and blue light received by said second image sensor; and
(e) decoding said electrical signal to produce a second color information signal representative of the red light received by said second image sensor and a third color information signal representative of the blue light received by said second image sensor.

19. The method according to claim 18, wherein the light of said second primary color light is red color light and wherein the light of said third primary color is blue color light.

20. The method according to claim 18, wherein the light of said second primary color is blue color light and wherein the light of said third color light is red color light.

21. A method of producing three color information signals representative of light received from an object, said method comprising:
(a) splitting light received from the object into first and second portions using a partially reflective mirror, said mirror passing said first portion comprising light of at least a first primary color, and reflecting said second portion comprising light of second and third primary colors;
(b) encoding the first portion into a first color information signal using a first charge coupled device image sensor, said first color information signal corresponding to the light of said first primary color received by said first image sensor;
(c) selectively filtering out said third primary color from a first part of said second portion, said first part of said second portion and the remaining part of said second portion separately impinging upon a second charge coupled device image sensor;
(d) encoding said first and second parts of said second portion into an electrical signal using said second charge coupled device image sensor, said electrical signal being representative of the light of said second and third primary colors received by said second image sensor; and
(e) decoding said electrical signal to produce a second color information signal representative of the light of said second primary color received by said second image sensor and a third color information signal representative of the light of said third primary color received by said second image sensor.

22. The imaging system of claim 21, wherein said first, second and fourth electrical signals comprise series of electrical pulses.

23. The imaging system of claim 22, wherein the pulses of said first electrical signal occur at essentially twice the frequency as the pulses of either of said second and fourth electrical signals.

24. The imagaing system of claim 23 further including a delay circuit means for delaying said first and second electrical signals for a first electrical signal pulse.

25. A method of producing three color information signals representative of light received from an object, said method comprising:
(a) splitting light received from the object into first and second portions, the first portion comprising light of at least a first primary color, and the second portion comprising light of second and third primary colors;
(b) encoding the first portion into a first color information signal using a first charge coupled device image sensor, said first color information signal corresponding to the light of said first primary color received by said first image sensor;
(c) selectively filtering said second portion through a first set of stripes of a striped optical filter to filter out said third primary color from a first part of said second portion, a second part of said first portion, including light of said third primary color, passing through a second set of stripes of said striped optical filter;
(d) encoding said first and second parts of said second portion into an electrical signal using a second charge coupled device image sensor, said electrical signal being representative of the light of said second and third primary colors received by said second image sensor; and
(e) decoding said electrical signal to produce a second color information signal representative of the light of said second primary color received by said second image sensor and a third color information signal representative of the light of said third primary color received by said second image sensor.

26. The method according to claim 25, wherein said striped optical filter comprises a filter having essentially constant width stripes, some of said stripes being of material opaque to light of at least one primary color.

27. The method according to claim 25, wherein said one primary color is blue.

28. A color imaging system in which light including three primary colors is received from an object, said system comprising:
(a) first means for separating at least a part of said received light into first and second portions, said first portion comprising a first one of said primary colors and said second portion comprising the second and third ones of said primary colors;
(b) a first charge coupled device image sensor responsive to said first portion for producing a first electrical signal representative of said first primary color;
(c) second means, including a second charge coupled device image sensor, responsive to said second portion for producing a second electrical signal representative of said second and third primary colors;

(d) an analog switch for producing third and fourth electrical signals from said second electrical signal, said third electrical signal being representative of said second primary color and said fourth electrical signal being representative of said third primary color; and
(e) a substracting circuit for producing a fifth electrical signal in response to said third and fourth electrical signals, said fifth electrical signal being representative of said third primary color, but not of said second primary color.

* * * * *